United States Patent [19]

Duranleau et al.

[11] 3,929,845

[45] Dec. 30, 1975

[54] PREPARATION OF ALKYLAMIDES

[75] Inventors: Roger G. Duranleau, Ardonia; John M. Larkin, Wappinger Falls, both of N.Y.

[73] Assignee: Texaco Inc., New York, N.Y.

[22] Filed: Dec. 12, 1974

[21] Appl. No.: 532,290

[52] U.S. Cl. ............................ 260/404; 260/561 R
[51] Int. Cl.² ............................... C07C 103/02
[58] Field of Search .................. 260/404, 561 R

[56] References Cited
UNITED STATES PATENTS

| | | | |
|---|---|---|---|
| 3,551,465 | 12/1970 | Ellis | 260/404 |
| 3,562,302 | 2/1971 | Ellis | 260/561 R |
| 3,772,358 | 11/1973 | Lang | 260/404 |
| 3,776,901 | 12/1973 | Kelly et al. | 260/561 R |
| 3,862,185 | 1/1975 | Love et al. | 260/561 R |

*Primary Examiner*—C. Davis
*Attorney, Agent, or Firm*—T. H. Whaley; C. G. Ries; George J. Darsa

[57] ABSTRACT

Alkylamides are prepared by contacting an alpha-nitroketone with hydrochloric acid in a carboxylic acid solvent.

14 Claims, No Drawings

PREPARATION OF ALKYLAMIDES

BACKGROUND OF THE INVENTION

This invention relates to a method of preparing alkylamides from nitroketones. In particular, this invention relates to a catalytic method for preparing alkylamides from alpha-nitroketones.

In the past, alkylamides have been prepared by such classical methods as the amination of carboxylic acids. However, many carboxylic acids are not readily available, particularly the odd carbon number chain fatty acids, and their manufacture from expensive reactants are required. Illustratively, the acids could be prouduced by oxidizing the corresponding alcohol or by employing a Grignard synthesis, each however requiring costly starting materials. Other methods for preparing alkylamides include the conversion of nitronitrosoalkane dimers by reaction with at least molar amounts of an anhydrous mineral acid for relatively short contact times. This method is not commercially attractive inasmuch as the mineral acid is consumed in the course of the reaction and the concentration of the charge in the strong acid must be kept low to avoid explosive reactions. The reaction is also water sensitive and the presence of water causes the alkylamides to be hydrolyzed to acids. Further, the amount of concentrated acid employed requires the use of costly corrosion resistant equipment. A method has now been found whereby a range of individual or mixtures of alkylamides having from 2 to 51 carbon atoms can be produced in good yields, which method can be conducted in less costly equipment.

SUMMARY OF THE INVENTION

Broadly, this invention contemplates a method of preparing an alkylamide which comprises contacting a nitroketone with hydrochloric acid in the presence of a carboxylic acid solvent.

According to this invention the contemplated alkylamides are prepared from 1-nitro-2-alkanones corresponding to the formula:

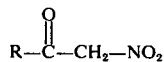

where R is an alkyl group having from 1 to 50 carbon atoms, preferably 5 to 30 carbons. Included as starting materials we mention 1-nitro-2-propanone, 1-nitro-2-butanone, 1-nitro-2-pentanone, 1-nitro-2-hexanone, 1-nitro-2-heptanone, 1-nitro-2-octanone, 1-nitro-2-decanone, 1-nitro-2-dodecanone, 1-nitro-2-tetradecanone, 1-nitro-2-pentadecanone, 1-nitro-2-hexadecanone, 1-nitro-2-heptadecanone and 1-nitro-2-hencicosanone. Mixtures of 1-nitro-2-alkanones as starting material are also contemplated and are converted to a mixture of amides. It will also be seen that the nitroketones employed in the instant method are terminal alpha-nitroketones where the nitro group is on the terminal carbon and the keto group is on the carbon adjacent thereto. Non-terminal alphanitroketones, that is, nitroketones where the nitro group is on other than a terminal carbon atom do not undergo the catalytic conversion to alkylamides as herein more fully described. The nitroketones contemplated as starting materials described above can be prepared in accordance with the procedure described in the art, as for example in U.S. Pat. No. 3,557,166, where the starting material is a 1-olefin. Essentially, this method involves contacting a 1-olefin having from 3 to 52 carbons at about −40° to 20°C. with dinitrogen tetroxide and oxygen where the reactant mole ratio of olefin to $N_2O_4$ to $O_2$ is between about 1:0.5:1 and 1:1.5:30 thereby forming a nitroalkylperoxy nitrate intermediate and thereafter contacting the nitroperoxy intermediate with a denitrating agent at about 60° to 70°C. employing a mole ratio of denitrating agent to peroxy compound of at least 1:1 and to about 20:1 thereby forming the 1-nitro-2-alkanone.

In particular, the instant method is further explained by the following equation:

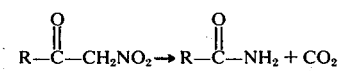

where R is as heretofore defined and where a by-product of the method is carbon dioxide. The reaction evolves carbon dioxide and the by-product formation drives the reaction to completion. It will be appreciated that the alkylamide formed in the course of the catalytic reaction possesses one carbon less than the starting terminal nitroketone and that the conversion reaction involves transformation of the nitroketone through rearrangement and cleavage.

More specifically, the method of this invention comprises catalytically converting a terminal alpha-nitroketone as hereinabove defined, or mixtures of terminal alphanitroketones, in the presence of a monocarboxylic acid solvent and as catalyst hydrochloric acid where the conversion is at a temperature of about 105°C. and up to about 160°C. At reaction temperatures below 105°C. the alkylamides are slowly formed and only in small amounts along with a substantial formation of undesired by-product. Reaction temperatures exceeding 160°C. cause a substantial reduction in the formation of the desired alkylamide and instead acid formation is promoted. Preferably, our catalytic method is undertaken at from about 110° to 140°C.

In one embodiment of this invention there is contemplated a method of converting terminal alpha-nitroketones to alkylamides at the temperatures recited above in the presence of hydrochloric acid as catalyst and a low molecular weight monocarboxylic acid as solvent. While dilute or concentrated hydrochloric acid can be employed, we prefer to employ concentrated hydrochloric acid. The amount of water in dilute hydrochloric acid, particularly when the higher mole ratios of catalyst to nitroketone are employed as described below, may in some instances cause the nitroketones to become insoluble in the solvent. The amount of water causing the loss of solubility of the nitroketone in the solvent will vary depending upon the particular solvent employed and the molecular weight of the nitroketone and the same can be easily determined by exprimentation. The presence of substantial amounts of water also diminishes the yield of desired amide product, particular when the higher reaction temperatures set forth herein are employed. Although the method need not be practiced under substantially anhydrous conditions, we nevertheless prefer that the water content in the reaction be maintained below 3 percent.

In accordance with the inventive method the nitroketone is contacted with hydrochloric acid in a mole ratio of nitroketone to acid of between about 1:0.01 and 1:10, preferably between about 1:0.1 and 1:5 and in the presence of a carboxylic acid. The carboxylic acid is employed as solvent or reaction medium in the instant method and assists in solubilizing the nitroketone. Suitably, carboxylic acids of from 1 to 16 cabon atoms can be employed as the reaction medium including formic acid, acetic acid, propionic acid, butanoic acid, isobutanoic acid, pentanoic acid, hexanoic acid, octanoic acid, decanoic acid, undecanoic acid, dodecanoic acid, and hexadecanoic acid. Preferably, we employ a carboxylic acid having from 1 to 6 carbons, the most preferred acid being acetic acid. The carboxylic acid solvent employed in our method can be present in the reaction in a mole ratio of nitroketone to solvent ranging from 1:1 to 1:100, preferably between about 1:4 and 1:40. These mole ratios permit the nitroketone to be at least partially soluble in the solvent at the reaction temperature set out above. By assuring at least partial solubility of the nitroketone in the carboxylic acid solvent, reaction times are shortened and improved yields of alkylamides are realized. In general, reaction times can range from about one-quarter to 24 hours. The presence of the carboxylic acid solvent is critical to the instant method inasmuch as contacting the nitroketone and hydrochloric acid in the absence of the aforementioned solvent provides only a low yield of alkylamide. Further replacing the carboxylic acid solvent with a non-polar solvent severly curtails the desired amide forming reaction.

Specific examples of the alkylamides prepared according to the inventive method include acetamide, propanamide, butanamide, pentanamide, hexanamide, heptanamide, octanamide, nonanamide, undecanamide, tridecanamide, tetradecanamide, pentadecanamide and eicosanamide.

At the completion of the reaction the alkylamide can be recovered by cooling the reaction mixture to about 30°C. and isolating the resulting solid by filtration. Alternatively, the reaction mixture after cooling to below about 60°C. can be contacted with iced water and the resulting amide crystals are recovered. Likewise, hydrochloric acid and the carboxylic acid solvent can be recovered by distilling the filtrate. The co-product, carbon dioxide, can be recovered, if desired, in the course of the reaction or at the completion thereof by scrubbing the exit gas with an amine base at room temperature and thereafter thermally decomposing the amine-carbon dioxide complex.

The alkylamides prepared according to the instant method are useful as foam stabilizers in synthetic detergents, ore flotation agents, solvents for waxes, dye solubilizers, plasticizers for polymers, surfactants, dispersants or diluents for reactions, and in the production of carbon paper, rubber and wax paper as well as intermediates in the preparation of fabric water repellents. In order to more fully illustrate the nature of our invention and the manner of practicing the same, the following examples are presented.

EXAMPLE I

To a solution of 6.0 grams (0.022 mole) of 1-nitro-2-hexadecanone in 50 milliliters of glacial acetic acid there was added 5 milliliters (0.06 mole) of concentrated hydrochloric acid and reaction was conducted for a period of 20 hours at 115°C. After cooling the reaction mixture to 25°C., the crystallized solids were filtered. After recrystallizing a sample of the solids with chloroform, the product was determined to have a melting point of 108°–109°C. A sample of the product upon infrared and nuclear magnetic resonance analysis was determined to be n-pentadecanamide.

EXAMPLE II

To 100 milliliters of propionic acid, there was added 2.0 grams (0.004 mole) of 1-nitro-2-hexadecanone and 1 milliliter (0.01 mole) of concentrated hydrochloric acid and the reaction was conducted for 12 hours at 115°C. After cooling the reaction mixture to 25°C., the crystallized solids were removed by filtration. The filtrate was diluted with 250 milliliters of water and the resultant precipitate was collected and water washed. The yield (1.6 grams) upon infrared analysis was determined to be predominantly n-pentadecanamide.

EXAMPLE III

Example II was repeated except that isobutyric acid was employed as solvent. The yield and product were essentially the same as in Example II.

We claim:

1. A method of preparing an alkylamide which comprises contacting a nitroketone with hydrochloric acid as catalyst in the presence of a carboxylic acid solvent.
2. A method according to claim 1 wherein said contacting is at a temperature of about 105°C. to about 160°C.
3. A method according to claim 1 wherein said contacting is a temperature of about 110° to 140°C.
4. A method according to claim 1 wherein the mole ratio of said nitroketone to said catalyst is between about 1:0.01 and 1:10.
5. A method according to claim 1 wherein the mole ratio of said catalyst to nitroketone is between 1:0.1 and 1:5.
6. A method according to Claim 1 wherein said nitroketone corresponds to the formula:

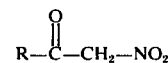

where R is an alkyl group of from 1 to 50 carbon atoms.

7. A method according to claim 6 wherein R is 5 to 30 carbons.
8. A method according to claim 1 wherein said nitroketone is 1-nitro-2-hexadecanone.
9. A method according to claim 1 wherein said nitroketone is 1-nitro-2-octadecanone.
10. A method according to claim 1 wherein said carboxylic acid has from 1 to 16 carbon atoms.
11. A method according to claim 1 wherein said carboxylic acid has from 1 to 6 carbon atoms.
12. A method according to claim 1 wherein said carboxylic acid is acetic acid.
13. A method according to claim 1 wherein said alkylamide is pentadecanamide.
14. A method according to claim 1 wherein said alkylamide is acetamide.

* * * * *